(No Model.) 5 Sheets—Sheet 1.

J. POWERS.
COIN CONTROLLED PHOTOGRAPHIC APPARATUS.

No. 565,297. Patented Aug. 4, 1896.

WITNESSES:
J. Nusblatt
George W. Jackel

INVENTOR
James Powers
BY
Gorman Raegener
ATTORNEYS.

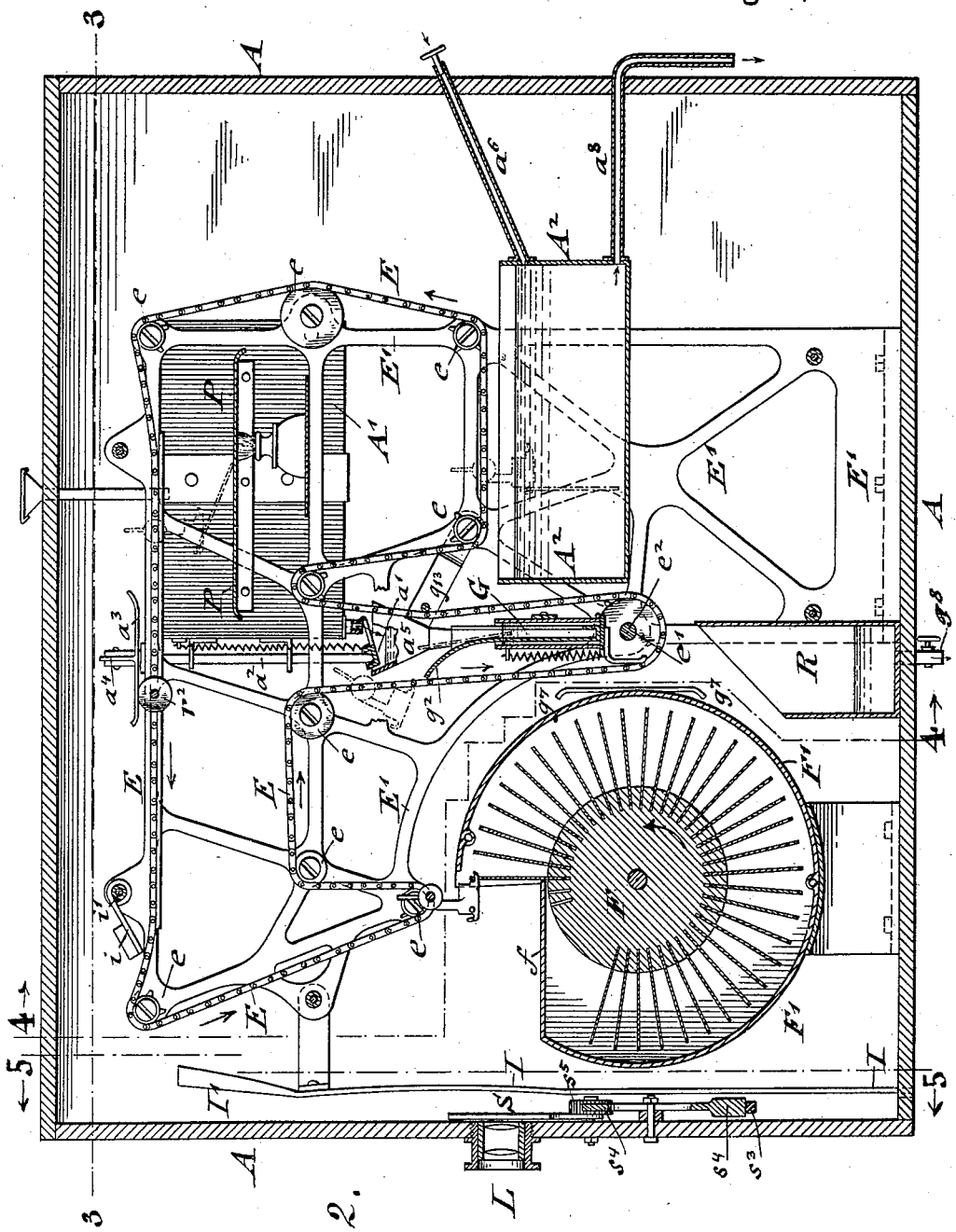

(No Model.) 5 Sheets—Sheet 3.
J. POWERS.
COIN CONTROLLED PHOTOGRAPHIC APPARATUS.
No. 565,297. Patented Aug. 4, 1896.
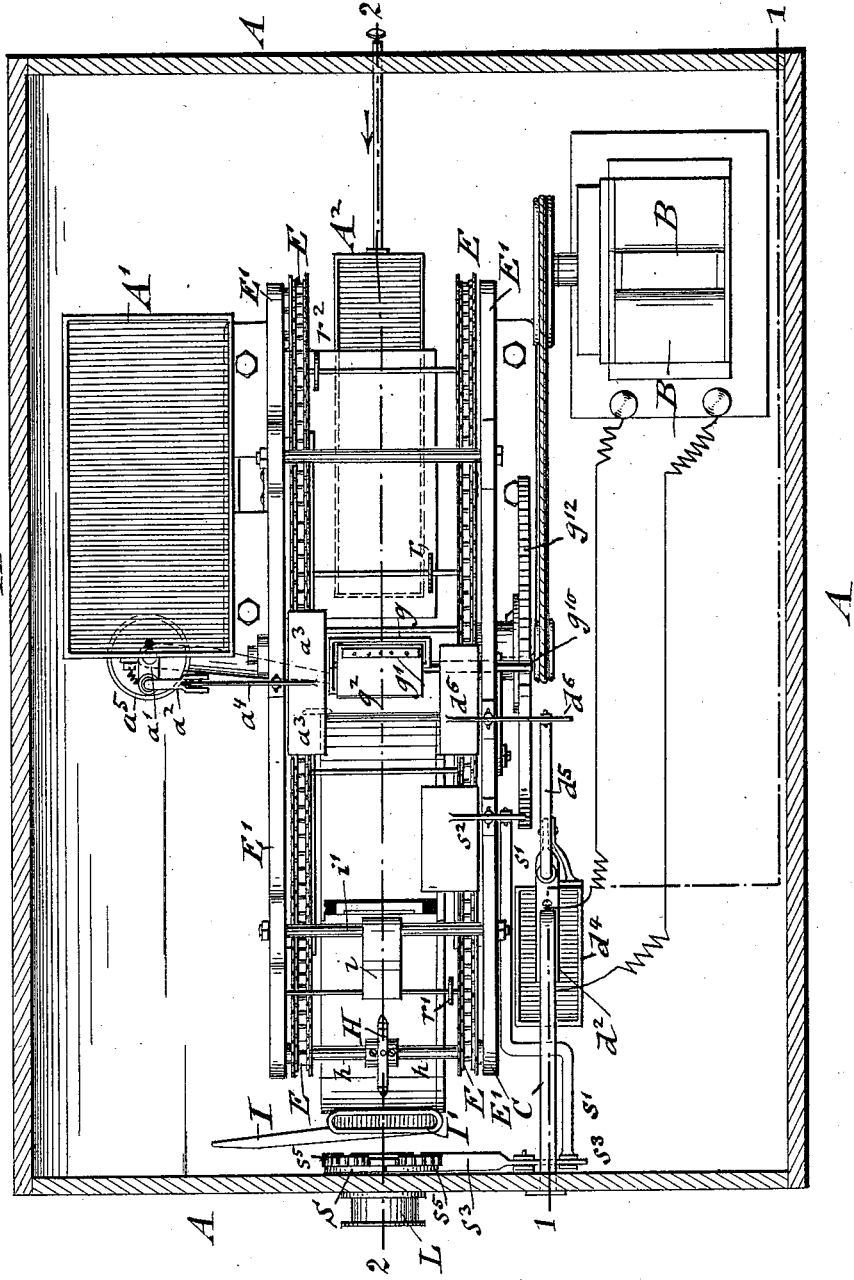
WITNESSES:
Geo. W. Jaekel
INVENTOR
James Powers
BY
ATTORNEYS.

(No Model.) 5 Sheets—Sheet 4.

J. POWERS.
COIN CONTROLLED PHOTOGRAPHIC APPARATUS.

No. 565,297. Patented Aug. 4, 1896.

WITNESSES:
J. Nussblatt
George W. Jackel

INVENTOR
James Powers
BY
Gorge Regener
ATTORNEYS.

(No Model.) 5 Sheets—Sheet 5.
J. POWERS.
COIN CONTROLLED PHOTOGRAPHIC APPARATUS.
No. 565,297. Patented Aug. 4, 1896.
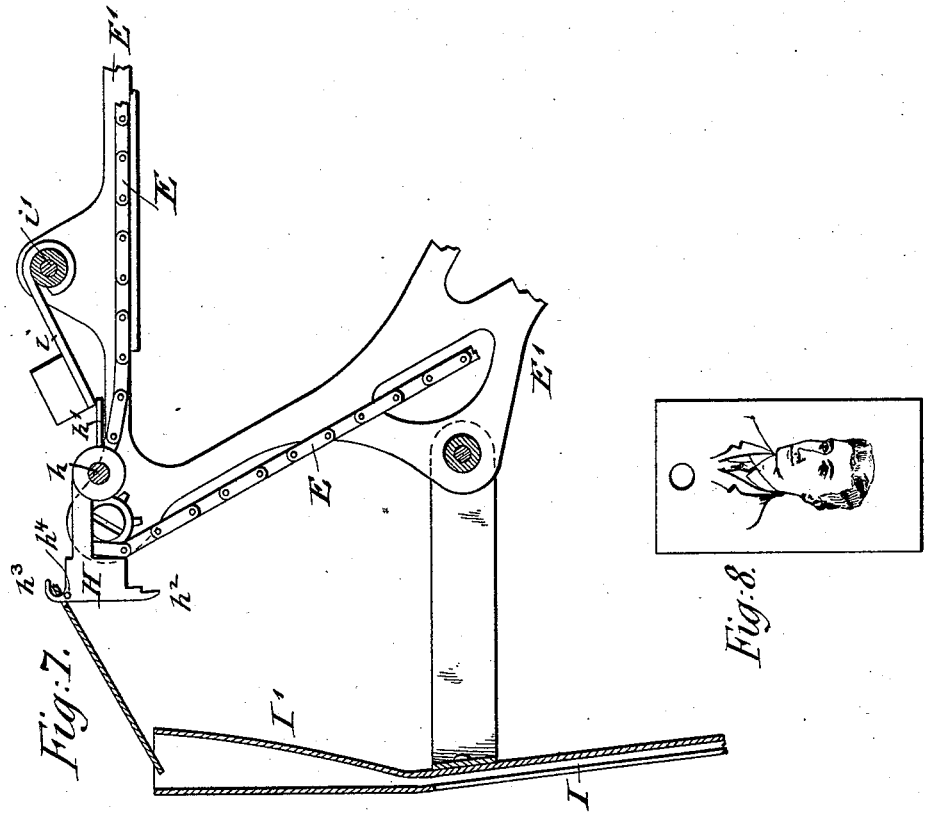
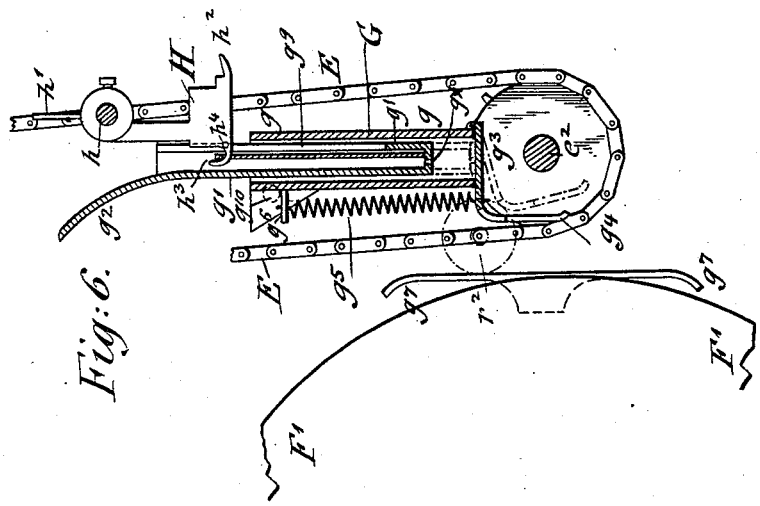
WITNESSES:
INVENTOR

UNITED STATES PATENT OFFICE.

JAMES POWERS, OF BROOKLYN, NEW YORK, ASSIGNOR, BY DIRECT AND MESNE ASSIGNMENTS, TO THE NATIONAL FERROTYPE MACHINE COMPANY, OF NEW YORK, N. Y.

COIN-CONTROLLED PHOTOGRAPHIC APPARATUS.

SPECIFICATION forming part of Letters Patent No. 565,297, dated August 4, 1896.

Application filed October 8, 1895. Serial No. 565,064. (No model.)

*To all whom it may concern:*

Be it known that I, JAMES POWERS, a subject of the Czar of Russia, residing at Brooklyn, in the county of Kings and State of New York, have invented certain new and useful Improvements in Coin-Controlled Photographic Apparatus, of which the following is a specification.

This invention relates to certain improvements in that class of coin-controlled apparatus by which the photographic image of a person or object can be automatically taken, developed, fixed, dried, and delivered on the dropping of a coin into the coin-chute of the apparatus; and the invention consists of a coin-controlled photographic apparatus which comprises a plate-reservoir with an intermittently-rotating plate-holder, a camera for taking the picture, a coin-chute, an endless chain provided with a pendent traversing plate-carrier for taking up the plate after the image is taken, means for releasing the plate from the plate-carrier and conducting it into the developing bath, means for removing the plate from the developing bath, a reservoir for supplying the developing solution, a fixing bath, means for drying the photographic picture, and means for delivering the same.

The invention consists, further, of a suitable actuating mechanism and a switch for starting the same on the introduction of a coin, in combination with the endless chain and a traversing plate-carrier, by which the plates are conveyed from the holder to the developing and fixing baths, the drying device, and the delivering-chute.

The invention consists, further, of certain details of construction and combinations of parts, to be hereinafter described, and finally pointed out in the claims.

Figure 1:
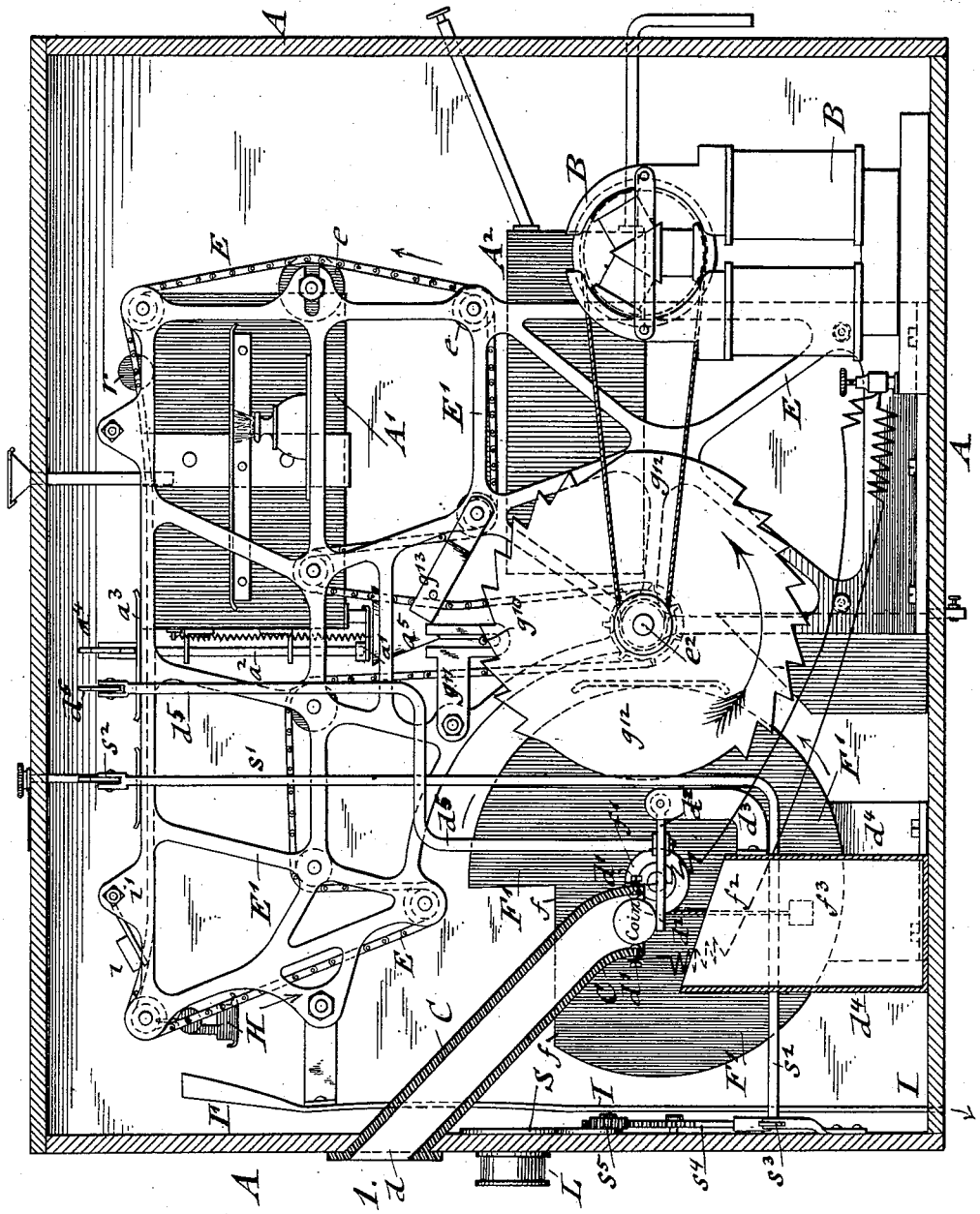
Figure 5:
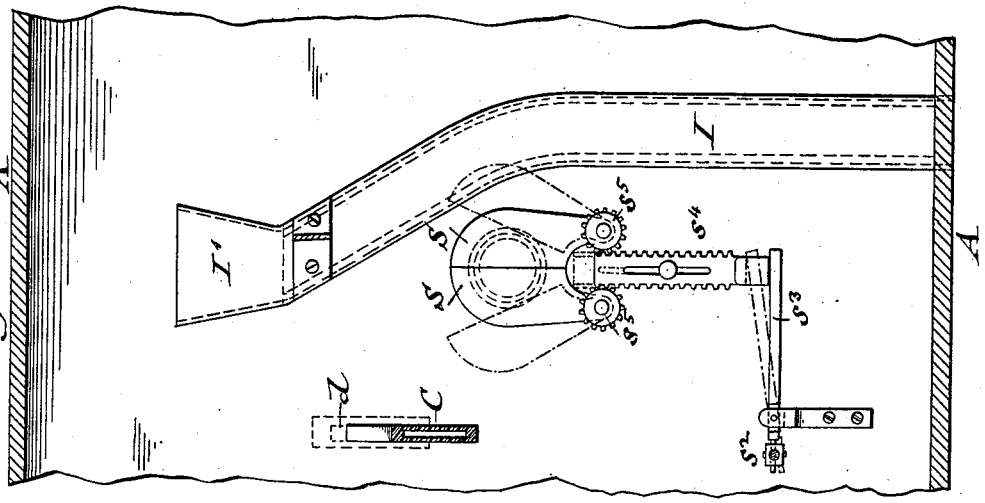
Figure 4:
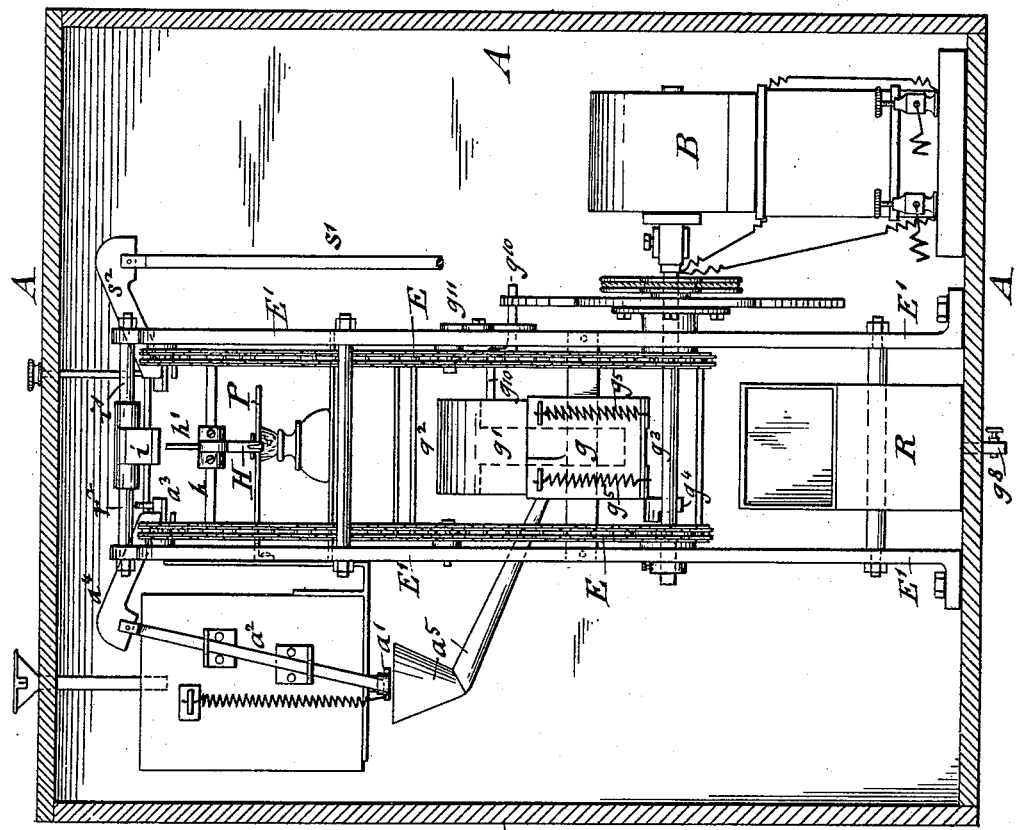

In the accompanying drawings, Figures 1 and 2 represent vertical longitudinal sections of my improved coin-controlled photographic apparatus, taken, respectively, on lines 1 1 and 2 2, Fig. 3. Fig. 3 is a plan view, partly in horizontal section, on line 3 3, Fig. 2. Figs. 4 and 5 are vertical transverse sections, taken, respectively, on line 4 4 and 5 5, Fig. 2, and showing the parts in the direction of the arrows on said section-lines. Fig. 6 is a detail vertical longitudinal section of the developing bath and mechanism for conducting the plate into the same. Fig. 7 is a detail sectional view of a portion of the delivering mechanism, showing it in the act of transferring the picture to the delivery-chute; and Fig. 8 is a detail front view of one of the plates after the picture is taken, developed, and fixed thereon.

Similar letters of reference indicate corresponding parts.

Referring to the drawings, A represents the inclosing box or casing in which the operative parts of my improved coin-controlled photographic apparatus are contained.

B is an electromotor, which is located at the lower rear part of the casing A and operated by an electric current conducted to the same whenever the switch is closed by the contact of a coin with pins at the lower end of a coin-chute C, the mouth of which is arranged in the front wall of the apparatus.

E E are two endless chains, which are guided over a suitable number of sprocket-wheels and guide-rollers $e$ $e$, that are supported on two upright frames E', which are attached to the bottom of the casing. The endless chains E are made in the nature of sprocket-chains and are actuated by a sprocket-wheel $e'$, which is keyed to a shaft $e^2$, supported in the bearings at the lower part of the upright frames E', said shaft receiving rotary motion by a transmitting belt and pulley from the armature-shaft of the electromotor B, as shown clearly in Fig. 1.

A plate-reservoir is arranged sidewise of the sprocket-wheel shaft $e^2$ and composed of an intermittently-rotating plate-holder F, that is formed of a radially-recessed roller or drum, into which a number of sensitized plates are inserted, and of a stationary cylindrical casing F', of sheet metal, that is open at its upper end so as to permit the removal of the plates as they are successively moved up to a horizontal stop-plate $f$ at the upper part of the casing F', as shown in Fig. 2.

The plates are preferably sheet-metal plates of any suitable size, to which the sensitized film is applied, and which, when placed in contact with the stop-plate $f$, are in line with a lens-tube L, through which the light is permitted to enter at the proper moment for taking the picture.

The shaft of the plate-carrying roller F is provided with a pulley $f'$, around which a string $f^2$ is wound and to which a weight $f^3$ is applied. This weight has a tendency to impart rotary motion to the plate-carrying drum F in the direction of the arrows shown in Figs. 1 and 2, so that one plate after the other is moved up against the stop-plate $f$ and thereby placed in position for taking a picture. The shaft of the plate-carrying roller F is supported in bearings at the center of the casing F', which latter incloses the roller entirely, so that the plates are not subjected to the light while in the casing.

At one point of the endless chains E is suspended from a transverse pivot-rod $h$ a pendent and weighted plate-carrier H, which is provided with a small hook $h^2$ at one end and a hook $h^3$ at the other end, said hooks serving to engage a hole in the end of each plate after the same has arrived in a vertical position at the upper part of the plate-reservoir and after an image has been taken by the opening of a shutter S, which is arranged back of the lens-tube L at the inner side of the front wall of the apparatus. The traversing plate-carrier H is arranged intermediately between the endless chains E E, and is only deviated from its vertical position when an arm $h'$ at its upper end strikes against an object in its path.

The shutter S is operated at the proper moment by means of a lever-rod S', which forms the connection of a fulcrumed lever $S^2$, that is located transversely above the upper part of one of the endless chains E with a lever $S^3$, fulcrumed to the front wall of the casing A, below the shutter S. The lever $S^2$ is actuated by a projection or roller $r$ on said chain E, by which the inner end of the lever $S^2$ is raised, the rod S' lowered, and the lower lever $S^3$ raised. The lever $S^3$ engages the lower weighted end of a vertically-guided double rack-bar $S^4$, which is in mesh with two pinions $S^5$, one at each side of the rack-bar, which pinions are applied to the pivoted ends of two oscillating shutter-sections located back of the lens-tube, and which are normally in closed position, as shown in Fig. 5, but which are quickly opened whenever a picture is to be taken, so as to assume the position shown in dotted lines in Fig. 5. The shutter-sections are closed again as soon as the lever $S^2$ is released, by the gravity of the rack-bar $S^4$, so that the entrance of light through the lens-tube into the apparatus is prevented.

The inclined coin-chute C is arranged at one side of the shutter and extended from a coin-slot $d$ in the front wall of the casing A to a point at one side of said plate-reservoir, the lower end of said coin-chute being provided at opposite sides with two contact-pins $d'$, with which the coin dropped in the coin-chute comes in contact so as to form a switch for closing thereby an electric circuit from a battery or other source of electricity, from which the current is conducted by means of conducting-wires and binding-posts to the electromotor B. While the coin forms contact with the contact-pins $d'$ it rests on a horizontal platform $d^2$, that is pivoted to an arm $d^3$, attached to the coin-receiving receptacle $d^4$, said platform receiving a tilting motion by a cranked lever-rod $d^5$, which is connected with the platform $d^2$ and operated by a fulcrumed lever $d^6$, whenever a plate at the inner end of the same is raised by the projection or roller $r'$ of the endless chains E, as shown in Fig. 2. As soon as the lever $d^6$ is operated by the roller $r'$ the platform $d^2$ is tilted and the coin dropped into the coin-receptacle $d^4$, which is located below the lower end or mouth of the coin-chute, from which the coins are removed from time to time. As soon as the platform $d^2$ is tilted and the coin dropped the switch connection which is formed by the coin with the contact-pins $d'$ at the lower end or mouth of the coin-chute C is interrupted and thereby the motion of the electromotor stopped.

Vertically above the driving-shaft $e^2$ of the endless chains E is arranged a developing bath G, which is composed of a stationary box $g$, in which is arranged a vertically-movable box $g'$, provided with an outwardly-bent deflecting-plate $g^2$ at its upper end. The lower part of the stationary box $g$ is closed by a hinged bottom $g^3$, which is provided with a downwardly-bent arm $g^4$, said bottom being tightly pressed against the lower edge of the box $g$ by a helical spring $g^5$, attached to said bottom and to a fixed pin $g^6$ at the upper part of the box $g$. A fixed guide-plate $g^7$ is attached to the outside of the casing F' of the plate-reservoir and serves to guide the roller $r^2$ of the endless chains E in downward direction, so that it acts on the downwardly-bent arm $g^4$ of the spring-actuated bottom $g^3$ and serves to open the latter, as shown in dotted lines in Fig. 6, whereby the developing liquid in the developing-box $g$ is discharged into a collecting-receptacle R arranged vertically below the developing bath at the bottom of the apparatus, from which receptacle the solution is drawn off from time to time by means of a discharge-pipe $g^8$, provided with a suitable stop-cock, as shown in Fig. 2. The movable box $g'$ is provided at one side with a central slot $g^9$, into which the rear hook $h^3$ of the traversing plate-carrier H enters when the latter is moved by the chains E E in line with said slot, so that it engages the hole in the end of the plate at the time in the box $g'$, as shown in Fig. 6. In the interval of time during which the traversing plate-carrier H moves from the ingoing end of the movable box $g'$ to the outgoing end of the same the box $g'$ is quickly reciprocated in the stationary box $g$ by means of a pin $g^{10}$, that is guided in a vertically-slotted keeper $g^{11}$, said pin being actuated by the teeth of a disk $g^{12}$, keyed to the shaft $e^2$. The disk $g^{12}$ is provided with two sets of teeth in its circumference and with intermittent untoothed portions, as shown in Fig. 1. As the teeth pass along the pin $g^{10}$ of the movable box $g'$, the latter is quickly reciprocated and thereby the plate which is dropped into the box subjected to the action of developing solution, so that the image is properly developed on the same. A fresh quantity of the developing solution is supplied for each plate from a reservoir A', having a bottom valve $a'$, which is opened by means of a spring-actuated connecting-rod $a^2$, that is lowered by the action of the roller $r^2$ on a plate $a^3$ at the inner end of a fulcrumed lever $a^4$, the outer end of which is connected with the rod $a^2$, as shown in Figs. 2, 3, and 4. Whenever the valve $a'$ is opened by the roller $r^2$ of the endless chains and the intermediate actuating mechanism, a certain quantity of the developing solution is supplied from the reservoir A' into the funnel-shaped upper part of an inclined delivery-pipe $a^5$, the lower end of which enters through the side wall of the stationary box $g$, as shown in Figs. 3 and 4. The endless chains are so guided that the traversing plate-carrier H is moved around the developing bath G, being first conducted in downward direction along one side, and then in upward direction along the opposite side of the same, the chains being guided over a fixed rod $g^{13}$, which is supported by the frame E and extends transversely across the path of the chains, as shown in Figs. 1 and 2, whereby the plate-carrier H is directed toward the plate in the box $g'$ and enabled to engage the hole of the same and take up the plate, as shown in Fig. 6.

From the developing bath the plate on which the picture is developed is next conducted by the plate-carrier H first in upward and then in downward direction, so as to enter a fixing bath $A^2$, which is located below a horizontally-guided portion of the chains E E. The plate suspended from the plate-carrier is then passed through the fixing bath, as shown in dotted lines in Fig. 2. A new quantity of fixing solution is supplied to the bath $A^2$ by an inclined pipe $a^6$, provided with a stopper $a^7$ and drawn off from the same by a bottom pipe $a^8$, as shown in Figs. 1 and 2. When the plate arrives near the opposite end of the fixing bath, the endless chains are guided in upward direction, so as to lift the plate out of the bath until it arrives above a horizontal platform P, which is arranged parallel with the upper horizontal portions of the endless chains E E, and at such a distance below the same that the photographic plate is compelled to pass in inclined position over the platform P, and be subjected during its passage over the same to the action of the heat of an alcohol or other suitable lamp located below the platform P. This heating of the plate causes the drying of the fixing solution and renders the plate ready for being delivered. The plate is then moved in forward direction toward the front part of the casing A until the plate-carrier H arrives near the upper front corners of the guide-frames E', when its upwardly-projecting arm $h$ is engaged by a weighted arm $i$, applied to a transverse pivot $i'$ at the upper part of the supporting-frames E', so that the plate-carrier H is moved into a horizontal position, as shown in Fig. 7, while the plate rests in an inclined position on pins $h^4$ at both sides of the rear hook $f^3$, and is placed over the upper funnel-shaped mouth I' of the delivery-chute I, into which the plate is gradually fed until it is released from the carrier H. At the moment when the weighted arm releases the plate-carrier H the latter resumes by gravity its vertical position, so that the hook $f^3$ of the plate-carrier releases the plate, and which is then free to drop into the mouth of the delivery-chute and slide through the latter until it is delivered at the bottom of the casing A to the person whose image was just taken by the apparatus.

It is obvious that the construction of the coin-controlled photographic apparatus can be made modified, in various particulars, without departing from the general features on which the apparatus is constructed. For instance, in place of one traversing plate-carrier, two may be used side by side, in which case the plate has to be provided with two holes for the hooks of the carriers, so as to be taken up by the same through the developing and fixing solutions and over the drying device to the delivery-chute. In place of an electromotor, a spring or other suitable motor may be used, which is then started by any suitable mechanism that is released at the proper time by the action of the coin dropped into the coin-chute.

The operation of my improved coin-controlled photographic apparatus is as follows: When a coin is dropped into the coin-chute, it starts the motor as soon as it arrives at the lower end of the coin-chute. The motor sets the endless hook-carrying chains in motion in the direction of the arrow, (shown in Figs. 1 and 2,) so that at the proper time the shutter of the lens-tube is opened and the photographic image of the person standing in front of the lens-tube transmitted to the sensitized plate, which is at that time in a vertical position at the upper open portion of the plate-reservoir. As soon as the shutter is closed the plate-carrier, which has been moved in downward direction by the endless chains, engages the hole in the end of the plate, raises the same above the casing of the plate-reservoir, and conducts it then in backward direction until the plate arrives above the upper curved end of the movable box in the developing bath. The plate is released by the curved end of the box $g'$ from the hook $h^2$ of the plate-carrier and dropped into the movable box in which it is subjected to the action of the developing solution. The developing bath is supplied with a sufficient quantity of the developing solution for each plate from the reservoir. While the plate is in the movable box a quick reciprocating motion is imparted to the box by the action of the teeth of the disk on the pin at the upper end of the box, so that the developing solution can act on all parts of the plate. The bottom of the developing bath is opened and the developing solution discharged into the receptacle below the bath, the lower end of the movable box being provided with a drain-opening $g^\times$, so as to permit the discharge of the solution into the outer box and from the same into the receptacle below the bath. The traversing plate-carrier is then passed without the plate around the developing bath and reëngages by its curved rear hook $f^2$ the hole in the plate and lifts the latter out of the developing bath and conducts it then in downward direction into the fixing bath. From this bath the plate is next conducted in upward direction and over the heating device, where it is dried, it being then conducted in forward direction to the front part of the apparatus, where the traversing plate-carrier is tilted so as to produce the detaching of the plate and the dropping of the same into the mouth of the delivery-chute and then through the same to the discharge-opening in the bottom of the apparatus. At the moment when this is accomplished, the coin is dropped from the coin-chute and the motor stopped, all the parts being then again in their initial or starting position, as shown in Fig. 1, until the next picture is to be taken. The shutter of the photographic camera, the valve by which the developing solution is supplied from the tank to the developing bath, and the mechanism for dropping the coin from the end of the coin-chute into the coin-receptacle are actuated by rollers on the endless chains, the motion of the parts being so timed that they are accomplished at the proper time.

The advantages of my improved coin-controlled photographic apparatus are as follows: first, the entire outfit for making the pictures is contained in a much smaller space than in similar apparatus heretofore in use; second, all the parts are entirely automatic in action from the time the picture is taken on the sensitized plate to the time when the picture is delivered from the apparatus; third, the operations required for making a picture are performed quickly and reliably as soon as a coin is dropped into the apparatus.

Having thus described my invention, I claim as new and desire to secure by Letters Patent—

1. In a coin-controlled photographic apparatus, the combination, of a plate-reservoir, a camera in line with the open portion of the same, a coin-chute, a motor, means between the coin-chute and motor for starting the same on the dropping of a coin, endless chains operated by said motor, a traversing plate-carrier suspended from said endless chains, a developing bath, a fixing bath, a drying device, a tilting device for the plate-carrier and plate, and a delivery-chute for the plate, substantially as set forth.

2. In a coin-controlled photographic apparatus, the combination, of a plate-reservoir, a camera in front of the open portion of said reservoir, endless chains, a motor for operating said chains, a traversing plate-carrier suspended from said chains and adapted to remove one of the plates at a time from said reservoir, a developing bath, a fixing bath, a drying device for the plates above the fixing bath, a tilting device for the plate-carrier, and a delivery-chute for the plate, substantially as set forth.

3. In a coin-controlled photographic apparatus, the combination of an intermittently-rotating plate-holder, a casing for the same, open at its upper part, endless chains, a motor for actuating said chains, a weighted plate-carrier suspended from said chains and adapted to engage successively one of the plates of the plate-holder, a lens-tube in line with the open part of the casing of the plate-reservoir, a shutter arranged at the inside of the lens-tube, means for operating said shutter by the endless chains, and means for closing the shutter at the proper time, substantially as set forth.

4. In a coin-controlled photographic apparatus, a plate-reservoir, composed of an intermittently-rotated plate-holder provided with radial recesses, and a casing inclosing the holder and provided with a horizontal stop-plate at its upper part and with an opening above said stop-plate, substantially as set forth.

5. In a coin-controlled photographic apparatus, the combination of endless chains, means for actuating the same, a weighted plate-carrier suspended from said chains, a developing bath formed of an outer box having a hinged and spring-actuated bottom, an interior vertically-reciprocating box provided with an outwardly-curved upper end for receiving the plate, means for intermittently supplying the developing solution to the bath, and means for intermittently opening the bottom of the box and discharging the same, substantially as set forth.

6. The combination, in a coin-controlled photographic apparatus, of endless chains, a pendent plate-carrier suspended from the same, a developing bath for the plate, means for releasing the plate from the carrier and conducting it into the bath, means for agitating the developing solution while the plate is in the bath, and means for moving the plate-carrier toward the plate so as to reëngage it and remove it from the developing solution for further treatment, substantially as set forth.

7. In a coin-operated photographic apparatus, the combination of endless chains, a pendent plate-carrier suspended from said chains, a developing bath, a reservoir for the developing solution, means for intermittently supplying the developing bath from the reservoir, and means for intermittently discharging the spent solution, substantially as set forth.

8. In a coin-controlled photographic apparatus, the combination, with endless chains, a motor for operating the same, a weighted plate-carrier suspended from said chains and adapted to engage a hole in the sensitized plates, a developing bath, a reservoir for the developing solution, a spring-actuated valve for said reservoir, means for actuating said valve so as to supply the required quantity of developing solution to the bath, and means for intermittently discharging the solution from the bath, substantially as set forth.

9. In a coin-controlled photographic apparatus, a developing bath composed of an outer box or casing provided with a hinged and spring-actuated bottom, a vertically-guided interior box provided with an outwardly-bent plate at its upper end and a drain-hole in its bottom, and means for imparting a vertically-reciprocating motion to said interior plate-holding box, substantially as set forth.

10. In a coin-controlled photographic apparatus, the combination of endless chains, a pendent plate-carrier supported by said chains, and a drying device having a platform arranged at a distance from the chains less than the size of the plate, whereby the plates are tilted or inclined as they are carried along on said platform, substantially as set forth.

11. In a coin-controlled photographic apparatus, the combination of endless chains, a pendent plate-carrier suspended from said chains, a stationary platform located parallel with and below said chains, and means for heating said platform so as to dry the plate in its passage over said platform, substantially as set forth.

12. In a coin-controlled photographic apparatus, the combination of endless chains, means for operating the same, a pendent plate-carrier provided with a hook adapted to take into a hole in a plate, and suspended from said chains, a tilting device for the plate-carrier and the plate supported thereby, and a delivery-chute arranged in juxtaposition to the tilting device, and adapted to receive and discharge the photographic plate, substantially as set forth.

13. In a coin-controlled photographic apparatus, the combination of an endless chain, a weighted plate-carrier pivotally supported on said chain and provided with a hook at each side of its lower end, said hooks being adapted to take up a plate, and means for detaching a plate from one hook so that the other hook is permitted to take up the same plate, substantially as set forth.

14. In a coin-controlled photographic apparatus, a weighted hook provided with a hook at each end adapted for taking up a sensitized plate, and with laterally-extending pins near the rear hook of the carrier, substantially as set forth.

15. In a coin-controlled photographic apparatus, the combination of endless chains, a motor for operating the chains, a coin-chute, a motor-starting device between the coin-chute and motor, a tilting platform at the lower end of the coin-chute for holding the coin in position at said lower end a laterally-movable plate actuated by said endless chains and lever connections between the platform and plate for tilting said platform at the proper time so as to drop the coin and stop the motor, substantially as set forth.

16. In a coin-controlled photographic apparatus, the combination of endless chains, an electromotor for operating said chains, a coin-chute provided at its lower end with two opposite contacts for the coin, electric conductors leading from the contacts to the electromotor, so that the motor is started when the circuit is closed by the coin, a tilting platform at the lower end of the coin-chute, and means actuated by said endless chains for tilting the platform at the proper moment, dropping the coin and breaking the circuit, substantially as set forth.

In testimony that I claim the foregoing as my invention I have signed my name in presence of two subscribing witnesses.

JAMES POWERS.

Witnesses:
PAUL GOEPEL,
GEORGE W. JAEKEL.